United States Patent [19]

Wedam

[11] Patent Number: 4,654,647
[45] Date of Patent: Mar. 31, 1987

[54] FINGER ACTUATED ELECTRONIC CONTROL APPARATUS

[76] Inventor: Jack M. Wedam, 2110 Pine Grove, Klamath Falls, Oreg. 97603

[21] Appl. No.: 653,527

[22] Filed: Sep. 24, 1984

[51] Int. Cl.$^4$ .................. G09G 3/02; H01H 13/70
[52] U.S. Cl. ................. 340/709; 200/5 A; 200/18
[58] Field of Search ........... 200/5 R, 5 A, 6 A, 17, 200/18, 52 R, 157; 400/473, 474, 485; 340/709

[56] References Cited

U.S. PATENT DOCUMENTS

| | | | |
|---|---|---|---|
| 2,532,228 | 11/1950 | Hesh | 400/485 |
| 3,319,884 | 5/1967 | Franklin | 235/145 R |
| 3,335,240 | 8/1967 | Dhaens et al. | 200/67 DA |
| 3,633,724 | 1/1972 | Samuel | 400/485 |
| 3,828,148 | 8/1974 | Roeser | 200/6 A |
| 3,950,634 | 4/1976 | Speiser | 235/145 R |
| 3,965,315 | 6/1976 | Wuenn | 200/6 A |
| 3,974,493 | 8/1976 | Cavaignac et al. | 340/324 AD |
| 4,020,391 | 4/1977 | Baxter et al. | 315/377 |
| 4,029,915 | 6/1977 | Ojima | 200/5 A |
| 4,065,650 | 12/1977 | Lou | 200/5 R |
| 4,067,431 | 1/1978 | Whitaker | 400/485 |
| 4,081,068 | 3/1978 | Zapp | 400/474 |
| 4,201,489 | 5/1980 | Zapp | 400/485 |
| 4,204,206 | 5/1980 | Bakula et al. | 340/721 |
| 4,204,207 | 5/1980 | Bakula et al. | 340/723 |
| 4,204,208 | 5/1980 | McCarthy | 340/745 |
| 4,209,784 | 6/1980 | Sumner et al. | 340/711 |
| 4,225,924 | 9/1980 | Trujillo | 364/411 |
| 4,246,452 | 1/1981 | Chandler | 200/5 A |
| 4,473,725 | 9/1984 | Kim | 200/6 A |
| 4,501,424 | 2/1985 | Stone et al. | 200/6 A X |
| 4,501,939 | 2/1985 | Hyltin et al. | 200/6 A |

*Primary Examiner*—J. R. Scott
*Attorney, Agent, or Firm*—Klarquist, Sparkman, Campbell, Leigh & Whinston

[57] ABSTRACT

A finger operable electronic control apparatus includes a finger pad actuator mounted to a base so as to be movable in several directions. The position of the finger pad is sensed and utilized in the generation of electrical control signals. These control signals are used to control movement of a cursor or other image on an electronic display screen, as well as for other purposes. In one specific form, the base is generally horizontal and the finger pad is mounted by trapezoidal mounts for movement in first and second mutually perpendicular directions. In addition, the base is mounted to a supporting structure for movement in a direction which results in corresponding movement of the supported finger pad in the third direction. Movement of the finger pad in the first, second and third directions, as well as the rate of movement, may be sensed and utilized to generate electrical control signals. Also, the finger pad may be movable upwardly and downwardly relative to the base, to provide an additional control signal. The finger pad tilts as it is moved in the first and second directions to facilitate its engagement by a user's finger.

20 Claims, 10 Drawing Figures

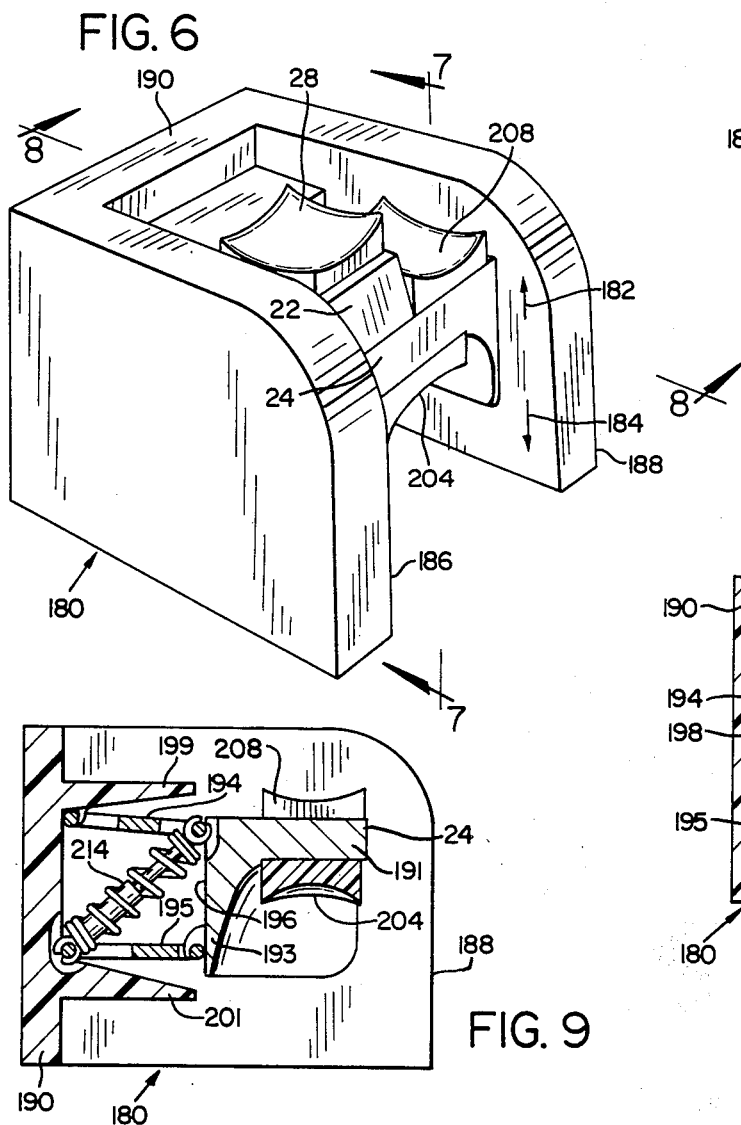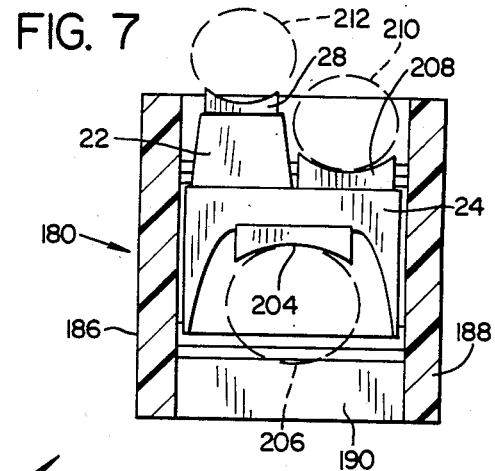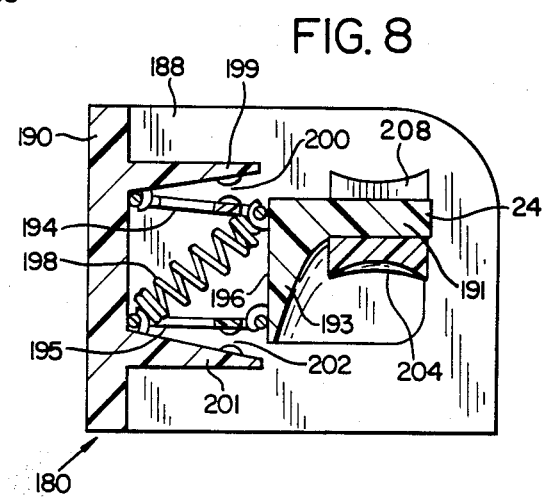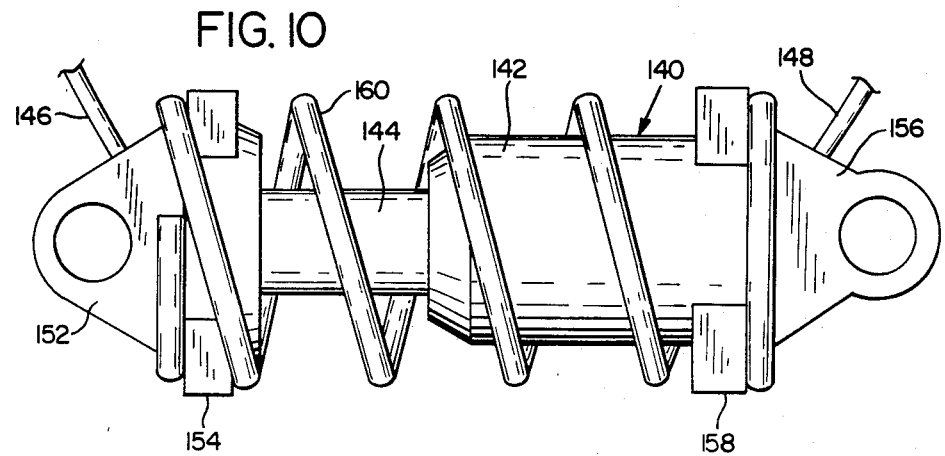

FINGER ACTUATED ELECTRONIC CONTROL APPARATUS

BACKGROUND OF THE INVENTION

1. Field of the Invention

The present invention relates to a finger operable electronic control apparatus of the type including a finger actuator movable in plural directions, and which is particularly adapted for controlling functions such as the movement of a cursor on a display screen.

2. Description of the Prior Art

Heretofore, one common approach for controlling the movement of a cursor on a display screen requires four cursor control keys. Each of these keys is associated with moving the cursor on the screen at a constant speed in a respective up, down, left, or right direction. One such device is produced by Wang Laboratories, Inc. of Lowell, Mass., and designated as a word processing terminal model number 5536-A. With this approach, an operator either has to use four fingers for moving the cursor in the four directions or shift one finger from key to key to position the cursor. In addition, each of these keys is only capable of controlling one function inasmuch as each key is dedicated to moving the cursor at one speed in only one direction.

Another example of a cursor control apparatus comprises a joy stick or lever which projects upwardly from and is pivoted to a housing and which is shiftable in different directions to control the movement of an electronic cursor or other image on a screen. Movement of the stick in different directions opens and closes electrical contacts which are then used in generating electrical signals. These signals control the movement of the image on the screen.

Although such devices may be operated by using a single finger, for example, on top of the joy stick, satisfactory control is difficult to achieve. To overcome this, the joy stick is usually grasped by the user's hand. However, it is more difficult to move one's hand than to move one's finger. As a result, a user's wrist can tire from heavy use of a joy stick. Moreover, with this approach, a user's other fingers are unavailable for other purposes.

Also, there are a number of prior multiple position switch designs. In one basic type, a central pin or rod is pivotally supported for movement in several directions, a finger operable button is connected to the rod and used to move the rod. Electrical contacts are opened and closed in response to the position of the rod. Electrical control signals are generated in response to the opening and closing of the contacts. In addition to the rod being movable in several directions, the button frequently may be moved up and down relative to the rod to generate an additional electrical control signal. U.S. Pat. Nos. 3,828,148 of Roeser; 4,081,068 of Zap; 4,201,489 of Zap; 3,335,240 of Dhaens; and 2,532,228 of Hesh exemplify such devices. It should also be noted that none of these references are understood to illustrate the use of such a multi-position electrical switch for controlling the motion of a cursor on a display screen.

Still other explarary multi-position switches are disclosed in U.S. Pat. Nos. 4,029,915 of Ogima; 3,965,315 of Wuenn and 3,633,724 of Samuel. In Ogima, keys are mounted by a central spring to a base for movement by a user's finger in one of four directions. Movement of the key is used to generate control signals which are transmitted to a calculator circuit electrically connected to contacts operated by the key. The patents to Wuenn and Samuel each disclose finger actuated typewriter keys which are movable in plural directions for use in controlling the printing of characters by a typewriter. In Samuel, the keys are supported by a central pivot with springs being utilized to bias the keys to a neutral position. The keys of the Wuenn device are pivotally supported by a central bolt so as to permit movement of the key in multiple directions.

Although these prior devices exist, there is a need for an improved finger operated electronic control apparatus movable in plural directions for use in generating electrical control signals, such signals being used to control the movement of a cursor or other image on a display apparatus and for other purposes.

SUMMARY OF THE INVENTION

A finger operable electronic control apparatus includes a finger pad actuator mounted to a base so as to be movable in several directions. The position of the finger pad is sensed and utilized in the generation of electrical control signals. These control signals are used to control movement of a cursor or other image on an electronic display screen, as well as for other purposes.

In one specific illustrated form, the base is generally horizontal and the finger pad is mounted by trapezoidal mounts for movement in first and second mutually perpendicular directions. In addition, the base is mounted to a supporting structure for movement in a third direction, resulting in corresponding movement of the supported finger pad in the third direction. Movement of the finger pad in the first, second and third directions is sensed and utilized to generate corresponding electrical control signals. Furthermore, the finger pad is movable upwardly and downwardly relative to the base to provide an additional control signal.

As another more specific aspect of the invention, the finger pad mounting structure is such that, as the finger pad is moved in either the first or second direction, the finger pad tilts. That is, the portion of the finger pad which leads the direction of motion raises while the portion of the finger pad which trails the direction of motion lowers. This tilting facilitates engagement of, and application of force to, the finger pad by the finger of an individual user of the device.

In one embodiment, on-off electrical switches are utilized to sense the position of the finger pad. The positions of these switches are used for generating electrical control signals for controlling, for example, the direction of motion of a cursor. In another embodiment, the position of the finger pad is continuously sensed, along with the rate of change of the position of the finger pad, in the first, second and third directions. Potentiometers may be used for this sensing. In this latter case, the rate of change of the finger pad in a particular direction may be utilized to control, for example, the direction and rate of movement of a cursor on a screen.

It is accordingly one object of the invention to provide an improved finger operated electronic control apparatus.

It is still another object of the invention to provide an improved finger controlled method of generating plural electrical control signals.

It is a further object of the invention to provide a single finger operated key and method for generating cursor control signals for moving a cursor or other images in at least two directions on a display screen.

A still further object of the invention is to provide a finger actuated electronic controller having a finger key mounted to a support for movement in two generally perpendicular directions with the support, and thereby the key, being movable in a third direction, the three directions of motion being sensed and utilized to generate electrical control signals.

A still further object of the invention is to provide a finger actuated electronic controller in which the direction and rate of change of the motion of the key is sensed and used to generate electrical control signals.

Still another object of the invention is to provide a finger actuated control apparatus in which a finger key tilts as the key is moved, to thereby facilitate the engagement of the finger actuator, and the application of force thereto, by a finger of an operator of the apparatus.

These and other objects, features and advantages of the present invention will become apparent with reference to the following description and drawings.

BRIEF DESCRIPTION OF THE DRAWINGS

FIG. 6 is a perspective view of a control apparatus in accordance with the invention, which incorporates the finger actuated control apparatus of FIGS. 1 through 5;

FIG. 7 is a cross-sectional view of the apparatus of FIG. 6, take along lines 7—7 of FIG. 6;

FIG. 8 is a cross-sectional view of the apparatus of FIG. 6, taken along lines 8—8 of FIG. 6;

FIG. 9 is a cross-sectional view of a control apparatus which is like the FIG. 8 view, except that contact switches and a return spring utilized in FIG. 8 have been replaced by a spring biased potentiometer; and FIG. 10 is an enlarged view of one form of a potentiometer suitable for use in the apparatus of the invention.

DETAILED DESCRIPTION OF THE PREFERRED EMBODIMENTS

Figure 1:
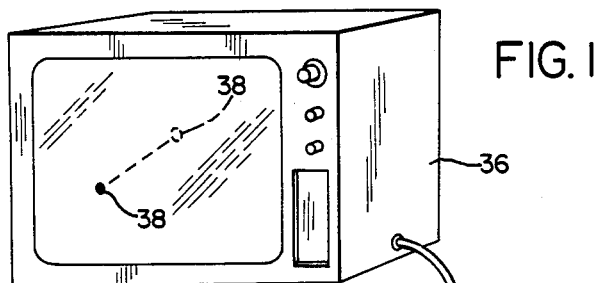
FIG. 1 illustrates a finger actuator electronic control apparatus in accordance with one form of the invention, utilized to control movement of a cursor or other image on a display apparatus.

With reference to FIGS. 1-5, and in particular with reference to FIG. 1, a finger actuated electronic controller in accordance with the invention is indicated generally at 20. Controller 20 includes a housing 22 mounted to a base 24. Supported on the base within the housing, and projecting upwardly through an aperture 26 of the housing, is a finger actuator or pad 28. This finger pad is supported for movement in first and second directions relative to the housing, as more fully explained below. Sensors within the housing sense the position of the finger pad. These sensors are electrically connected, by conductors of an electrical cable 30, to an electrical signal generator 32. The signal generator is connected to a power source not shown. In response to the position of the finger pad 28, circuit 32 generates electrical control signals which are fed by electrical conductors within a cable 34 to an electrical display means such as a television set 36. These signals in turn control the movement of a cursor or image 38 on the screen. For example, cursor 38 may be moved, in response to movement of finger pad 28, from the position shown in solid lines to the position shown in dashed lines in FIG. 1.

Inasmuch as the display device 36 may comprise a television set, a word processing terminal, an oscilliscope, or other commercially available display device, it will not be described in detail. Also, suitable electronic signal generating circuits, such as circuit 32, would be readily apparent to those skilled in the art. As a specific example, circuit 32 may comprise the commercially available Atari Model 2600 controller.

Figure 3:
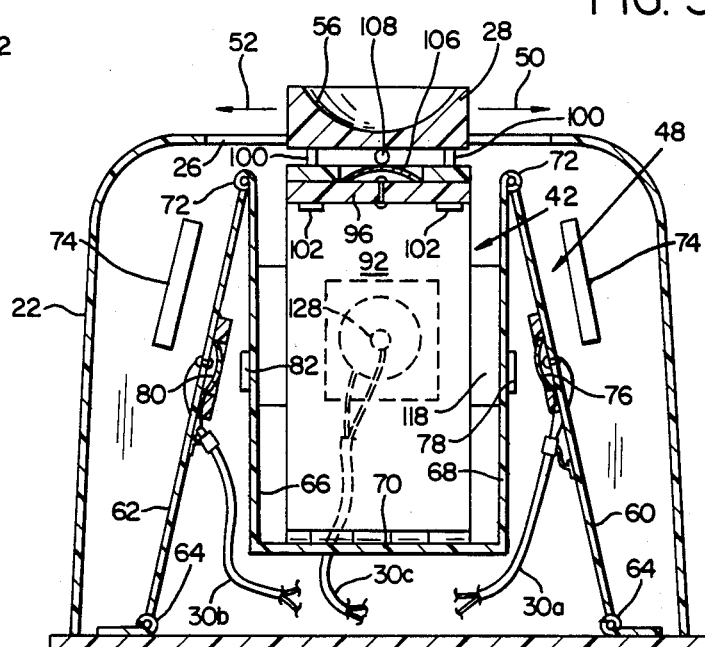
FIG. 3 is a cross-sectional view of the finger actuated control apparatus of FIG. 1, taken along lines 3—3 of FIG. 1.
Figure 2:
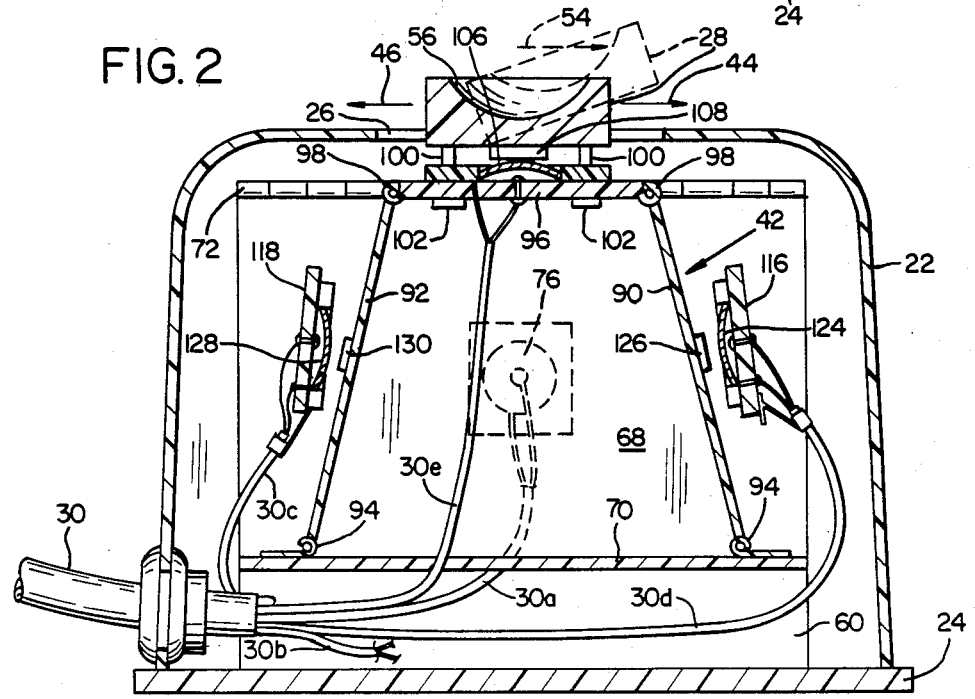
FIG. 2 is a cross-sectional view through the finger actuated control apparatus of FIG. 1, taken along lines 2—2 of FIG. 1.

Referring more specifically to FIGS. 2 through 5, the finger actuated controller 20 will next be described in detail. With reference to FIG. 2, controller 20 includes a first mounting mechanism 42 for supporting the finger key or pad 28 for movement in first directions indicated by arrows 44 and 46 generally along a first line relative to the housing 22. In addition, as shown in FIG. 3, the controller also includes second mounting mechanism 48 which supports the first mounting mechanism 42, and thereby the finger pad 28, for movement in second directions indicated by arrows 50, 52. The second directions 50, 52 are generally along a second line which is generally normal to the first line. In addition, the first and second directions are generally in a common horizontal plane.

It should be noted that, when mounted in the manner shown in FIGS. 2 and 3, as the finger pad 28 moves in a given direction, the leading edge of the finger pad raises relative to the housing 22 while the trailing edge lowers relative to the housing. Thus, the finger pad tilts as it is moved. This makes it easier for an operator to engage and apply force to the finger pad as it is moved. Also, the degree of tilting may be sensed by the operator's finger to provide feedback to the operator of the finger pad 28 position relative to a neutral position. This tilting is shown in exaggerated form in FIG. 2 for movement of the finger pad in the direction of arrow 44. As the finger pad is moved in the direction 44 from the position shown in solid lines in FIG. 2, the finger pad tilts as shown in dashed lines in this figure. That is, the finger pad tilts from a horizontal to a more vertical orientation. This facilitates the application of force, as indicated by dashed arrow 54, against the finger pad by an operator's finger. In addition, the upper surface 56 of the finger pad 28 is of a cupped or concaved design to further enhance the engagement of the finger pad by an operator's finger. Although the finger pad 28 tilts as it is moved along the first and second lines, the primary directions of motion of the finger pad are somewhat linear. Furthermore, these are generally in a common plane and are normal to one another.

As best seen in FIG. 3, the illustrated second mounting mechanism 48 comprises a pair of upright spaced apart sides or walls 60, 62. These walls taper inwardly from bottom to top. That is, the spacing between the walls decreases moving upwardly along the walls. The lower end of each of the walls 60, 62 is pivoted by a hinge 64 to the platform 24 for pivoting about an axis which is normal to the second direction and parallel to the first direction. Thus, each of these walls 60, 62 is movable in the directions 50, 52 about the axes of the hinges 64. In addition, the second mounting means includes a generally U-shaped central member comprised of first and second vertical side walls 66, 68 and a lower base 70 which interconnects the lower edges of the side walls. The central member depends from, and is suspended from, the upper ends of the respective walls 60, 62. This is accomplished by pivotally connecting the upper end of the wall 66 to the upper end of the wall 62 and the upper end of the wall 68 to the upper end of the wall 60. Hinges 72 are utilized to accomplish this connection. The axes of hinges 72 are parallel to the axes of hinges 64 so that the central member is also movable in directions indicated by arrows 50, 52.

Stops 74, mounted to the housing 22, are positioned to engage the respective walls 60, 62 and limit the motion of these walls, and thus of the finger pad 28, in the directions 50, 52. An on-off push button electrical switch 76 is mounted to the wall 60 and a switch actuator 78 is mounted to the wall 68. Switch 78 is closed when engaged by actuator 78, but is otherwise open. A similar switch 80 is mounted to the wall 62 and an actuator 82 for this switch is mounted to the wall 66. Of course, equivalently, the actuators and switches may be interchanged. When so mounted, these switches sense the position of the finger pad 28 along the respective directions 50, 52. That is, as the finger pad 28 is moved in the direction 50, actuator 78 engages the switch 76 and closes this switch. This closes an electrical circuit comprised of conductors 30a and the switch. Conductors 30a are included within cable 30 which leads to the electronic control circuit 32. Consequently, when switch 76 is closed, an electrical signal may pass from the controller 32, through the switch 76, and back to the controller 32. The controller then interprets this signal to indicate that the actuator 28 has been moved in the direction 50 to a switch actuating position. The controller 32, in response to this signal, shifts the image 38 on the display screen 36. The switch 80 and actuator 82 operate in the same manner when the finger pad 28 is moved in the direction 52. Additional cables 30b electrically couple this switch 80 to the controller 32. Thus, movement of the finger actuator in the directions 50, 52 is sensed and utilized to generate electrical control signals.

With reference to FIG. 2, the first mounting mechanism 42 will next be described. This mechanism includes a pair of spaced apart upright walls 90, 92 which taper inwardly from bottom to top. That is, the space between these walls decreases moving upwardly along these walls. The lower ends of these walls are pivoted by hinges 94 to the base portion 70 of the second mounting mechanism. The hinges 94 extend along an axis normal to the directions 44, 46 and thus permit movement of the walls 90, 92 in these directions. The upper ends of the respective walls 90, 92 are joined together by a generally horizontal platform 96 pivoted to these upper ends by hinges 98. The hinges 98 are oriented with pivot axes parallel to the pivot axes of hinges 94. This again permits movement of the walls 90, 92 in the first direction. The base portion 70, walls 90, 92 and platform 96 provide an isosceles trapezoidal support for the finger pad 28.

Although the finger pad 28 may be mounted directly to the platform 96, or otherwise connected to the upper walls 90, 92, in the preferred embodiment, the finger pad 28 is slidably connected to the platform 96 for upward and downward movement relative to the platform. This sliding connection is accomplished by pins 100 which project downwardly from the underside of finger pad 28 and pass through apertures in the platform 96. Heads 102, which may be formed by flattening the pins 100 after they have been inserted through the platform 96, prevent the removal of the finger pad from the platform after it has been installed. An electrical on-off switch 106, like the switches 76, 80, is mounted to the upper surface of the platform 96. In addition, a switch actuator 108 is mounted to the underside of the finger pad 28. Upward and downward motion of the finger pad 28 relative to the platform 96 causes the switch 106 to switch between closed and open positions. Electrical connectors 30e, forming part of the cable 30, are connected to the controller 32. The position of the switch 106 is monitored by the controller and utilized to generate an electrical control signal. For example, in a video game, depressing the finger pad 28 may control a function such as firing of a spaceship gun at a target.

With continued reference to FIG. 2, stops 116, 118 are mounted to extend between the walls 66 and 68 of the second mounting mechanism 48. These stops limit the motion of the walls 90, 92 in the respective directions 44 and 46. Electrical switches, similar to the switches 76, 80 and 106 previously described, are positioned between the wall 92 and stop 118 as well as between the wall 90 and stop 116. More specifically, one such switch 124 is mounted to the stop 116 and a switch actuator 126 is mounted to the wall 90. Similarly, a switch 128 is mounted to the stop 118 and a switch actuator 130 is mounted to the wall 92. As the finger pad 28 is moved in the direction of arrow 44, actuator 126 engages the switch 124 and causes it to shift between open and closed positions. Electrical conductors 30d form an electrically conducting circuit whenever the switch 124 closes. Conductors 30d form a part of the cable 30 connected to the controller 32. The controller 32 monitors the position of the switch 124 and generates an electrical control signal in response to the open and closed states of the switch. In the same manner, movement of the finger pad 28 in the direction of arrow 46 causes the shifting of switch 128 between open and closed positions. Conductors 30c, which are included in the cable 30, are utilized by the controller 32 to sense the position of switch 128. Controller 32 generates electrical control signals in response to the operation of the switches 124 and 128.

Thus, the movement of the finger pad 28 along a first line in first directions 44 and 46 is sensed. Also, movement of the finger pad in a second line along directions 50, 52 is sensed. These relative motions are sensed by switches and monitored by controller 32 for use in generating electrical control signals. In addition, the upward and downward movement of the finger pad 28, relative to the housing 22, is also sensed and utilized to generate an electrical control signal.

Although the operation of the finger actuated control apparatus 20 has been described in connection with controlling the movement of a cursor or other image on a screen, utilizing an Atari Model 2600 Controller, the actuator is applicable to other operations as well. For example, in robotics, the position of the switch may be sensed and utilized to generate electrical control signals for controlling the direction of motion of a robot arm.

Figure 4:
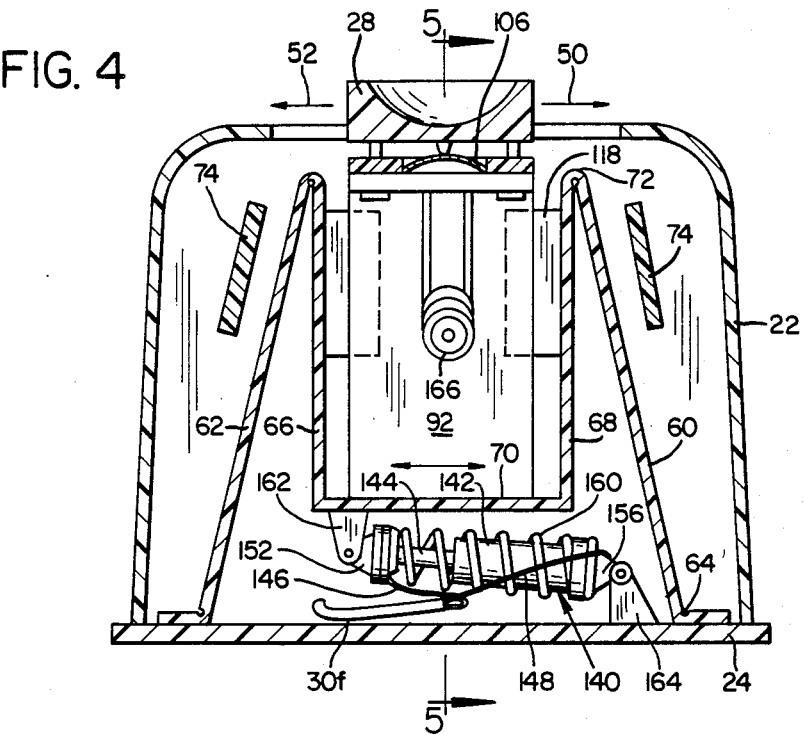
FIG. 4 is a cross-sectional view through an alternate embodiment of a finger actuated control apparatus in accordance with the invention, taken along lines 4—4 of FIG. 5.
Figure 5:
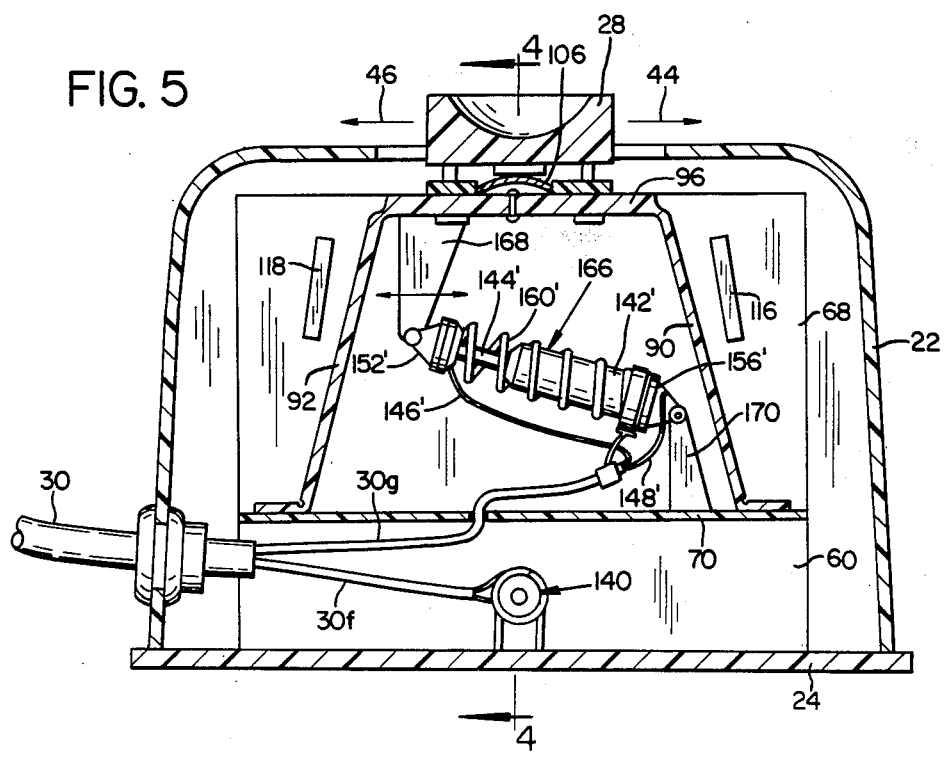
FIG. 5 is a cross-sectional view of the apparatus of FIG. 4, taken along lines 5—5 of FIG. 4.

The embodiments of FIGS. 4 and 5 are similar to the embodiments of FIGS. 2 and 3. Therefore, like components in these embodiments are numbered with like numbers. In the embodiments of FIGS. 4 and 5, the position sensing switches 76, 80, 124, and 128 have been eliminated. Although other position sensors are suitable, in these latter embodiments, potentiometers, such as of the form illustrated in FIG. 10, are utilized to sense the position of the finger. More specifically, with reference to FIG. 4, the switches 76 and 80 have been replaced by a potentiometer 140.

With reference to FIG. 10, potentiometer 140 includes a housing 142 which slidably receives a plunger or wiper arm 144. The plunger 144 is electrically coupled to a conductor 146 which forms one conductor of a conductor pair 30f (FIG. 4). The potentiometer windings, not shown, within the housing 142 are electrically connected to another conductor 148 of the conductor pair 30f. Also, the end of plunger 144 within housing 142 is electrically coupled to the windings. The resistance between the pair of conductors 146, 148 depends upon the position of the plunger 144 relative to the housing 142. As is the case for a typical potentiometer, this resistance varies with the motion of the plunger. The free end of the plunger 144 comprises a connector portion 152 which has an enlarged collar 154. Also, a connector portion 156, having an enlarged collar 158, is provided at the end of the housing 142. A return spring 160, with a first end portion engaging the collar 154 and a second end portion engaging the collar 158 is provided and biases the potentiometer plunger to a neutral position.

Referring again to FIG. 4, a potentiometer mounting bracket 162 projects downwardly from the platform 70 while another mounting bracket 164 projects upwardly from the base 24. The connector 152 of the potentiometer 140 is pivoted to bracket 162. In addition, the potentiometer connector 156 is pivoted to the bracket 164. As the finger pad 28 is moved in the direction indicated by arrow 50, the plunger moves relative to the housing 142. This varies the resistance in the circuit including conductors 146 and 148. Furthermore, this resistance varies continuously with the movement of the finger pad 28. Moreover, the rate of this variation in resistance, and therefore the rate of movement of the finger actuator 28, is ascertainable by passing a constant current through the conductors 146, 148 and measuring the change in voltage in the circuit. This voltage may then be used as an electrical control signal to, for example, control the direction and rate of movement of a cursor on a display screen. In the same manner, when the finger pad 28 is moved in the direction 52, the resistance is also varied and is sensed.

With reference to FIG. 5, the switches 124 and 128 have been replaced with a potentiometer 166, which is like potentiometer 140. Because of this similarity, like components of the potentiometer 166 are designated with the number used for the corresponding components of potentiometer 140, except with a prime. In addition, a mounting bracket 168 projects downwardly from the platform 96 and a mounting bracket 170 projects upwardly from the base 70. As the finger pad is moved in the directons 44 and 46, the plunger 144' of potentiometer 166 moves relative to the potentiometer housing 142' and varies the resistance of potentiometer 166. Thus, the resistance between conductors 146' and 148' is varied. These latter conductors form a conductor pair 30g which is coupled to an electronic controller in the same manner as the conductor pair 30f. Like potentiometer 140, the potentiometer 166 provides an indication of the rate and direction of motion of the finger pad 28, except in the directions of arrows 44 and 46 instead of in the direction of arrows 50, 52. In each case, the return springs 160, 160' bias the finger pad to its center starting position. This facilitates the control of the finger pad motion.

Additional embodiments of the invention are shown in FIGS. 6 through 9. In these embodiments, the finger actuated control apparatus 20, including a finger pad 28 and housing 22, is mounted to a supporting structure so that the entire control apparatus 30 is movable in a third direction. More specifically, the base 24 of the housing 22 is enlarged and mounted to a support or body 180 for movement relative to the body. That is, base 24 is mounted for movement generally along a third line in directions indicated by arrows 182, 184. This third line is approximately normal to the first and second lines along which the finger pad 28 is movable. Thus, when the base 24 is moved in either the direction 182 or 184, the supported finger actuated controller 20 and its finger pad 28 is moved in such directions and relative to the body 180. The direction of movement of the base 24, relative to the body 180, is sensed and used to generate additional electrical control signals.

In the embodiments shown, body 180 includes a first pair of parallel spaced apart legs 186, 188 and a back piece 190 which interconnects the legs to form a channel between the legs. The base 24 is positioned in this channel for upward and downward movement relative to the body.

With reference to FIG. 8, the base 24 includes a generally horizontal first portion 191 and a downwardly projecting rear leg portion 193. First and second links 194 and 195 are provided for pivotally connecting the base 24 to the back piece 190 for movement in the desired direction. These links 194, 195 are parallel, with each being pivoted at one end to the back piece 190 and pivoted at its other end to the rear surface 196 of the leg portion 193. A return spring 198 biases the links 194, 195 and thus the base 24 to a neutral position. Stops 199 and 201 project into the channel from the inner surface of back piece 190. These stops limit the upward and downward movement of the links 194 and 195 and thus of the base 24 and supported finger pad 28. An electrical switch 200 is operatively positioned between the links 194 and stop 199. In addition, a switch 202 is operatively positioned between the link 195 and stop 201. The switches 200, 202 sense the movement of the base 24 in the respective directions 182 and 184. Specifically, as the platform moves in the direction 182, switch 200 closes to indicate movement of the base 24 and supported finger pad in this direction. Also, as base 24 is moved downwardly, switch 202 closes to indicate this motion. These switches 200, 202 are electrically connected to a controller in the manner previously described and are used in the generation of electrical control signals. Therefore, with this embodiment, in addition to the control signals generated in response to movement of the finger pad 28 along the first and second lines, as well as generated in response to upward and downward movement of this finger pad, relative to base 24, control signals are generated in response to the motion of the base 24 and supported finger pad 28 along the third line. Thus, the finger actuator may be utilized to control, for example, the movement of a robot arm. In this application, movement of the finger pad 28 along the first line is used to generate control signals for controlling the movement of the robot arm, for example, from left to right. Movement of the finger pad along the second line is used to generate control signals for controlling movement of the arm, for example, toward and away from the operator. Furthermore, movement of the base 24 relative to the body 180 is sensed and used, for example, to generate signals which control movement of the arm upwardly and downwardly. Moreover, upward and downward movement of finger pad 28 relative to base 24 may be used, for example, to control a welding operation performed by the robot arm.

As best seen in FIG. 7, a concave or cupped finger engagement surface 204 is provided along the undersurface of the base 24. This surface may be engaged by the user's thumb 206, as shown in dashed lines. In addition, a finger rest 208 is provided on the upper surface of the base 24. Finger rest 208 is adjacent to the finger actuated controller and its finger pad 28. The upper surface of rest 208 is also cupped or concave to facilitate reception of a user's third finger 210, shown in dashed lines. The user's index finger 212, shown in dashed lines, is used to control the operation of the finger pad 28. Thus, using a single hand, control signals may be generated which correspond to the movement of the finger pad 28 along first and second mutually perpendicular lines; to the movement of the base 24 and supported finger pad 28 along a third direction and relative to the body 180; and to the upward and downward movement of the finger pad 28 relative to the base 24.

Finally, in the embodiment of FIG. 9, the switches 200, 202 of the FIG. 8 embodiment have been eliminated. In addition, the return spring 198 of FIG. 8 has been replaced with a spring biased potentiometer 214 of the type shown in FIG. 10. The resistance of the potentiometer 214 varies in response to the movement of base 24 in the directions 182, 184. This variation in resistance is sensed, as previously explained, and is utilized to generate electrical control signals.

Therefore, as is apparent from the above description, a convenient and easily usable finger actuated electronic controller and method of providing electrical control signals is provided by applicant's invention.

Having illustrated and described the principles of my invention with reference to several preferred embodiments, it should be apparent to those persons skilled in the art that such invention may be modified in arrangement and detail without departing from such principles. I claim as my invention all such modifications as come within the true spirit and scope of the following claims.

I claim:

1. A finger-operable electronic control apparatus comprising:
   a base;
   a finger pad;
   first and second mounting means for connecting said finger pad to the base; the first mounting means being pivotally carried by the second mounting means for pivotal movement of the first mounting means in a first direction, the first mounting means comprising means for supporting the finger pad such that the finger pad moves in the first direction with the pivoting of the first mounting means in the first direction;
   said second mounting means being pivotally connected to said base for movement in a second direction such that as the second mounting means is moved in the second direction, the first mounting means and supported finger pad move in the second direction with the movement of the second mounting means, whereby said finger pad is movable in said first and second directions between a plurality of operating positions;
   sensing means for sensing the operating position of said finger pad.

2. An apparatus according to claim 1 wherein said first mounting means includes a set of first supports each of substantially the same length and first pivot means for pivotally attaching each of said first supports to said second mounting means so as to permit movement of said first support and the supported finger pad in said first direction; and said second mounting means includes a set of second supports each of substantially the same length and second pivot means for pivotally attaching each of said second supports to said base so as to permit movement of said second supports, and thereby the first mounting means and supported finger pad, in said second direction.

3. An apparatus according to claim 2 wherein said sensing means comprises first electrical switch means operably connected to said first supports such that said first switch means open and close depending upon the position of said first supports and second electrical switch means operatively connected to said second supports such that said second switch means open and close depending upon the position of said second supports.

4. An apparatus according to claim 3 in which said first and second directions are generally in a common plane and normal to one another, said first mounting means also including means for supporting said finger pad for movement in a third direction normal to the first and second directions, said apparatus also including third electrical switch means operatively connected to said first mounting means and to said finger pad such that movement of the finger pad in the third direction open and closes the third switch means.

5. An apparatus according to claim 3 including cursor control means electrically connected to said first and second switch means for generating a cursor control signal in response to the open and closed positions of said first and second switch means and thereby in response to the position of the finger pad.

6. An apparatus according to claim 2 wherein said first and second pivot means comprise hinges.

7. A finger-operable electronic control device according to claim 2, wherein said sensing means comprises first and second variable resistance, potentiometers, said first potentiometer being operably connected to said first mounting means and said second potentiometer being operably connected to said second mounting means, whereby motion of said first and second mounting means in response to movement of said finger pad varies the resistance of said first and second potentiometers an amount which corresponds to the position of said finger pad.

8. An apparatus according to claim 1 including cursor signal generating means coupled to said sensing means for generating cursor control signals in response to the operating position of said finger pad, said apparatus also including display means electrically coupled to said cursor signal generating means for visually displaying a cursor and for moving the cursor in at least two directions in response to the cursor control signals and thereby in response to the operating position of the finger pad.

9. An apparatus according to claim 1 in which said first mounting means comprises a first pair of upright spaced walls which taper inwardly from their lower ends, and a platform connected to the upper ends of said first walls, said finger pad being supported by said platform, the first walls and platform together forming a trapezoid, said second mounting means comprising a second pair of upright spaced walls which taper inwardly from their lower ends to their upper ends, the lower ends of said second walls being pivotally connected to said base for pivoting movement in the second direction, a central member pivotally attached to and depending downwardly from the upper ends of said second walls, and the lower ends of said first walls being pivotally connected to said central member for pivoting movement in the first direction.

10. An apparatus according to claim 1 including a body and third mounting means for mounting said base to said body for pivotal movement of said base in a third direction, whereby the finger pad is moved in the third direction with the movement of the base, and said sensing means comprises means for sensing the movement of the finger pad in the first, second and third directions.

11. An apparatus according to claim 10 in which said base is generally horizontal, said finger pad being supported by said first and second mounting means above said base, the underside of said base including thumb engagement means positioned and shaped for engagement by the thumb of an operator of the apparatus, the upper side of said base including finger rest means for engagement by a finger of the operator other than the finger utilized to operate the finger pad, this letter finger and thumb being used to apply pressure to the base to move the base in the third direction.

12. A finger-operable electronic control apparatus comprising:
a finger pad;
mounting means for supporting the finger pad for movement in first and second directions between a plurality of operating positions, said mounting means comprising means for supporting said finger pad such that the finger pad tilts with the portion of the finger pad which is leading in the direction of motion raising and the portion of the finger pad which is trailing in the direction of motion lowering as the finger pad is moved in the first and second directions; and
electrical sensing means for sensing the operating position of said finger pad.

13. Finger actuated controller apparatus, comprising:
a generally horizontal base;
a second set of upright sides having a lower end portion movably attached to said base by a second pair of parallel spaced apart pivots;
a central member movably attached to an upper end portion of said second set of sides and extending downwardly toward said base;
a first set of upright sides movably attached at their lower ends to said central member by a first pair of parallel spaced apart pivots;
a platform movably attached to the upper ends of said first set of sides;
a finger actuator attached to said platform for movement in several different directions so as to cause said first sides to pivot about said first pivots and said second sides to pivot about said second pivot; and
electrical means for sensing the position of said actuator and for generating electrical signals corresponding to such positions.

14. An apparatus according to claim 13 in which the electrical means includes plural switch means which are switched between open and closed positions by movement of said actuator.

15. An apparatus according to claim 14 including means for mounting said actuator to said platform so as to permit upward and downward movement of said actuator, said switch means including push-button switch means positioned for operation by the upward and downward movement of said actuator and plural other switch means which are switched between open and closed positions by movement of said actuator.

16. An apparatus according to claim 13 in which the electrical means includes variable resistance potentiometer means which is adjusted by movement of said actuator.

17. An apparatus according to claim 13 in which the electrical means includes a display means for adjusting the position of a cursor in at least two directions on said display means in response to movement of said actuator.

18. An apparatus according to claim 13 in which the second set of sides taper inwardly from their lower ends at said base, and said first set of sides form a trapezoid with said platform connected to their upper ends and their lower ends connected to said central member.

19. An apparatus according to claim 13 including first stops carried by said central member and opposite to said first set of sides and second stops mounted to said base and opposite to said second set of sides.

20. A method of generating electrical control signals comprising:
moving a finger actuator relative to a finger actuator supporting base in first and second mutually perpendicular directions;
electrically determining the positions of the finger actuator in the first and second directions relative to the base;
moving the base in a third direction relative to a base support body, whereby the movement of the base results in a movement of the supported finger actuator in the third direction;
electrically determining the positions of the base in the third direction; and
generating electrical control signals in direct response to the sensed position of the finger actuator in the first and second directions and in direct response to the sensed position of the base, and thus of the finger actuator, in the third direction;
the first and second directions being generally in a common plane and the third direction being generally normal to the common plane; and
in which the common plane is generally horizontal, the method also including the step of mounting the finger actuator for upward and downward movement relative to the base, electrically determining the upward and downward movement of the finger actuator, the step of generating electrical control signals also comprising the step of generating electrical control signals in direct response to the upward and downward position of the finger actuator relative to the base.

* * * * *

UNITED STATES PATENT AND TRADEMARK OFFICE
CERTIFICATE OF CORRECTION

PATENT NO. : 4,654,647
DATED : March 31, 1987
INVENTOR(S) : JACK M. WEDAM

It is certified that error appears in the above-identified patent and that said Letters Patent is hereby corrected as shown below: On title page, item [56]

In References Cited (U.S. Patent Documents):

Add the following references:
```
  3,271,532  9/1966  Lopez                    200/6A
  4,492,128  1/1985  Heidelberger, et al.     200/6A
  4,517,424  5/1985  Kroczyuski               200/5RX
```

Col. 1, line 56: "Zap" should be --Zapp--;
Col. 1, line 57: "Zap" should be --Zapp--;
Col. 1, line 63: "Ogima" should be --Ojima--;
Col. 1, line 64: "Ogima" should be --Ojima--; and
Col. 7, line 60: "directons" should be --directions--.

In the Claims:

Col. 11, line 21: "claim 10" should be --claim 1--;
Col. 11, line 29: "letter" should be --latter--;
Col. 12, line 17: "mcans" should be --means--; and
Col. 12, line 42: "support" should be --supporting--.

Signed and Sealed this

Third Day of August, 1993

Attest:

MICHAEL K. KIRK

*Attesting Officer*     Acting Commissioner of Patents and Trademarks